May 11, 1926.  1,584,615
J. H. CORTHESY
COMBUSTION OF FUEL AND APPARATUS THEREFOR
Filed March 29, 1924   3 Sheets-Sheet 1

Inventor.
Jules H. Corthesy
By George A. Prevost
Atty

May 11, 1926. 1,584,615
J. H. CORTHESY
COMBUSTION OF FUEL AND APPARATUS THEREFOR
Filed March 29, 1924   3 Sheets-Sheet 2

Inventor.
Jules H. Corthesy
By
George A. Prevost
Atty.

May 11, 1926.
J. H. CORTHESY
1,584,615
COMBUSTION OF FUEL AND APPARATUS THEREFOR
Filed March 29, 1924    3 Sheets-Sheet 3
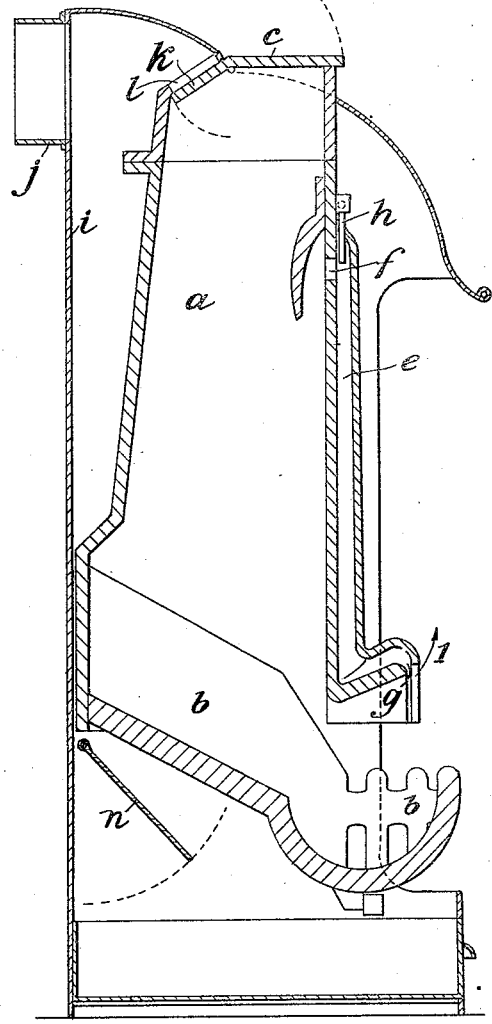
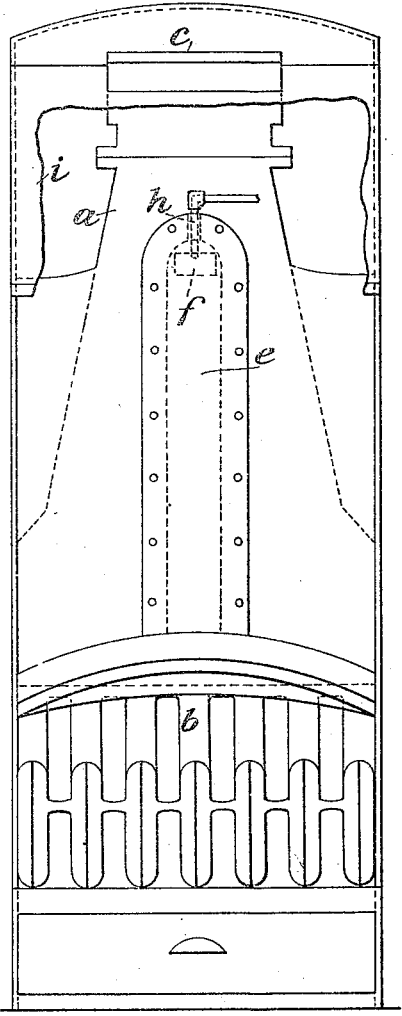
Inventor:
Jules H. Corthesy
By
George A. Prevost
atty.

Patented May 11, 1926.

1,584,615

UNITED STATES PATENT OFFICE.

JULES HIPPOLYTE CORTHESY, OF BARNSBURY, LONDON, ENGLAND, ASSIGNOR OF ONE-HALF TO ALBERT WALTER MILLS, OF LONDON, ENGLAND.

COMBUSTION OF FUEL AND APPARATUS THEREFOR.

Application filed March 29, 1924. Serial No. 702,805.

This invention relates to the combustion of fuel and smoke generated therefrom and to means for effecting such combustion.

According to the invention the fuel is distilled, by heat from a burning portion thereof, the whole or a part of the distillation products being mixed with town or other combustible gas and consumed by contact with the said burning portion.

In a suitable way of carrying out the invention some of the smoke, gas or volatile matter generated from the fuel, such as coal or coke, is mixed with the town or other gas before burning and the pressure of the latter gas is arranged to act as in a Bunsen burner to draw in the generated smoke or gas with which it mixes, the mixture issuing and burning at any suitable part of the grate. The apparatus comprises a partly closed receptacle or chamber to hold the supply of fuel, say, coal, which is heated from below by a fire fed by gravity or in any other suitable manner with fuel from the said receptacle through an opening at the bottom of the latter on to a suitable grate. The fuel is introduced into the receptacle at its upper part, which is then closed hermetically. Ribs or the like are provided on the walls of the receptacle to allow an upward easy passage of the smoke and hot gases and in order to assist the easy downward movement of the fuel, and avoid its sticking or adherence to the walls of the receptacle, especially at the point where a certain temperature will produce such an effect, the cross area of the receptacle is increased downwards. One or more ports is or are provided, for instance, at the top part of the fuel receptacle, for the passage of the generated gases or smoke to the gas suction passage for mixture with the town or other gas and subsequent burning in contact with the solid fuel fire, the said mixture passing through a burner, slit or nozzles which is or are advantageously arranged over and down the sides of the stove.

As the solid fuel is incandescent at its front part or part exposed to view, and as the line of combustion of the gas mixture corresponds with the bottom of the front wall of the fuel receptacle, this latter more or less acts as a low temperature carbonizing or distilling retort and any surplus smoke or volatile matter not entering the gas suction or gas mixing device will pass downwards and through the opening formed by the space between the incandescent fuel in the stove and the burner of the gas mixture, both lines of combustion forming a kind of barrage to effect the combustion of this surplus.

One or more projecting surfaces or ribs may be provided on the front of the hopper to be heated by the flames of the fire to assist in completing combustion of any smoke that may escape from the stove.

Dampers or valves may be used to control the admission of air to the stove at the bottom of the fuel chamber, for instance, a swinging flap or valve.

In one form of the improved stove the products of combustion pass into a casing partly surrounding the fuel receptacle, which casing is connected to the chimney by a short pipe. In this case the door for the fuel receptacle or chamber is provided with an extension or flap which, when the said door is opened, uncovers an opening in the said chamber to allow any smoke passing upwards through the fuel to be drawn into the chimney.

The improved stove can also be constructed to fit in any existing chimney to replace the ordinary grates, the casing above referred to being dispensed with.

To enable the invention to be fully understood I will describe it by reference to the accompanying drawings, in which:—

Figure 1:
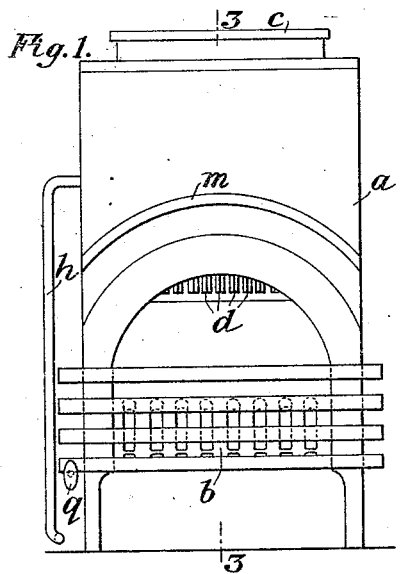
Figure 1 is a front view of a metal stove constructed in accordance with the invention.
Figure 3:
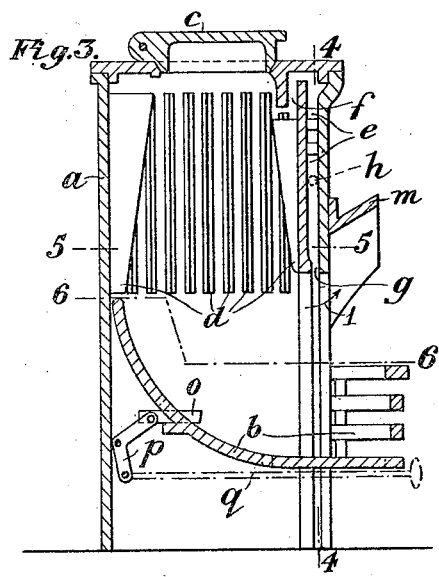
Figure 3 is a vertical section on the line 3—3, Figure 1.
Figure 5:
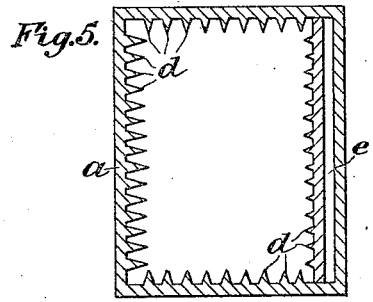
Figure 4:
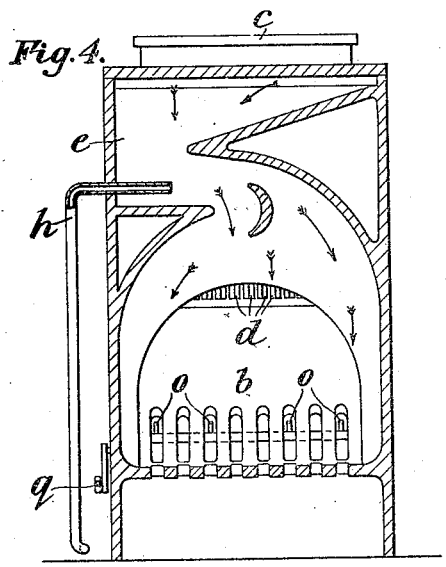
Figure 2:
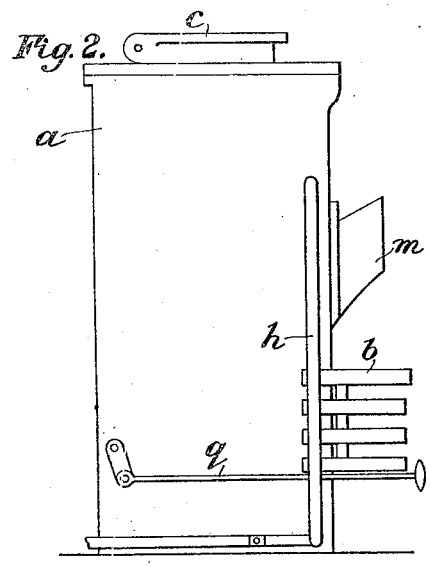
Figure 2 is a side view thereof.
Figure 6:
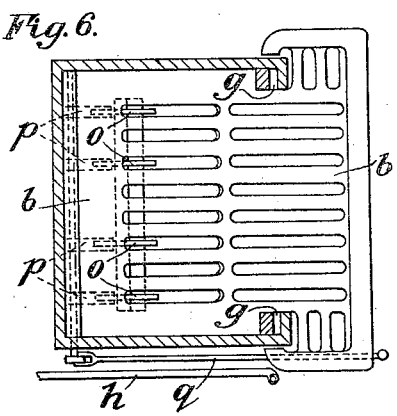

Figures 4, 5 and 6 are, respectively, sections on the lines 4—4, 5—5 and 6—6, Figure 3.

Figure 7:
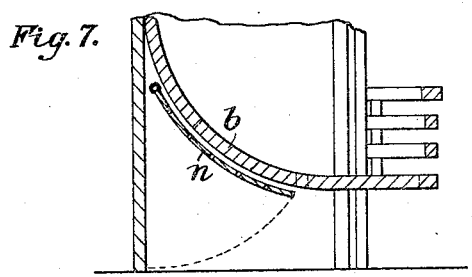

Figure 7 is a view similar to the lower part of Figure 3, illustrating a modification.

Figure 8:
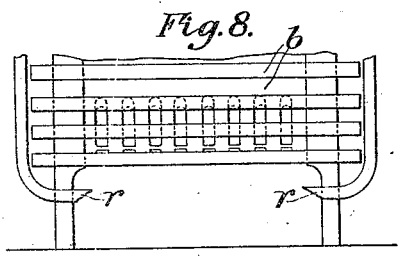
Figure 9:
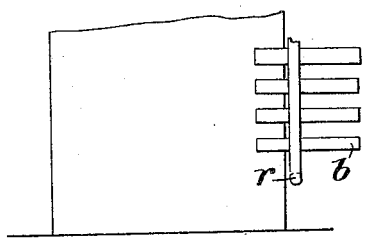

Figures 8 and 9 are front and side views of the lower part of the stove, illustrating a further modification.

Figure 10 is a front view of a stove with a part broken away illustrating a further modification, and Figure 11 is a vertical section on the line 11—11, Figure 10.

Figure 12:
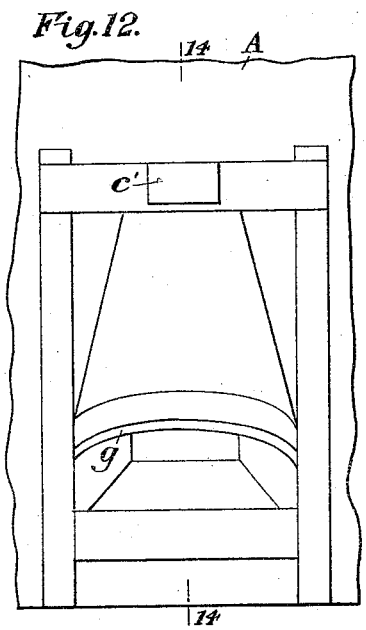
Figure 14:
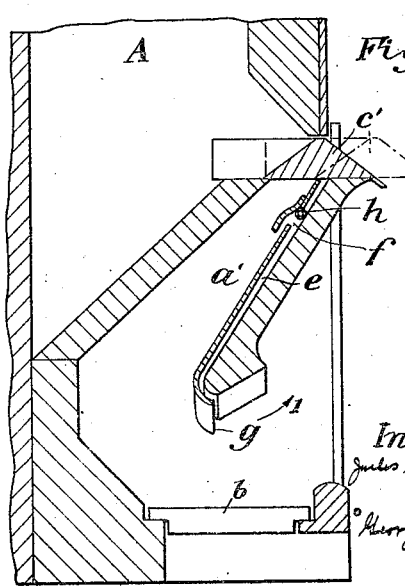
Figure 13:
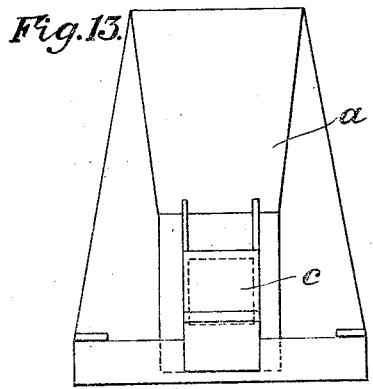

Figures 12 and 13 are, respectively, a front view and a plan of the improved stove when made of refractory material and Figure 14 is a section on the line 14—14, Figure 12.

In Figs. 1 to 6, *a* represents a chamber or hopper receptacle for the supply of fuel, closed at its top by a closure *c*, which may be either hinged to the top of said chamber or removable therefrom, to permit said chamber to be charged with fuel. This chamber *a* is open at its lower extremity and provided with a grate *b*, whereby said fuel passes by gravity onto said grate, where it is burnt and becomes incandescent, the heat from the combustion of which effects the carbonization or distillation of the fuel in the chamber.

*d* indicates a series of vertically extending ribs on the inner walls of the chamber *a* to facilitate the upward passage of smoke and other products of the fuel in said chamber and to avoid any sticking or adherence of the fuel to the said walls. These ribs, as clearly shown, are of a tapering form with small ends downward to permit the easy gravitation of the fuel.

In the front wall of the chamber *a* is a gas suction passage *e*, opening at its upper end into said chamber *a* by a port *f*, and at its lower end at the point *g* in the form of a slit, which extends over, and down the sides of the grate. *h* is a gas pipe connected at one end to the passage *e*, for discharging town or other combustible gas into said passage, so that smoke and other distillation products from the fuel in the chamber will be drawn through said port *f* and discharged at the point *g*, together with the gas, onto the incandescent fuel, where the mixture will be burnt, the products of combustion passing upwardly in the direction of the arrow 1, Fig. 3. In the event of any smoke or other distillation products not entering the passage *e*, they will pass downward and be consumed at the point *g*.

*o* represents a series of short rods arranged horizontally between the bars at the back of the grate bottom to which are pivotally connected a series of bell crank levers *p*, adapted to be controlled by a hand manipulated rod *q*. The reciprocation of this rod *q* will in turn reciprocate the short rods *o* to poke the fuel on the grate so as to break it up and drive it forward into a burning position.

On the front wall outside the chamber *a*, I provide a projecting surface *m* for assisting combustion, said projecting surface being heated by the flames from the fire.

The stove illustrated in Figs. 1 to 6 and 12 to 14 is designed to take the place of ordinary domestic open fire grates or stoves, the products of combustion escaping directly into an open chimney flue above said stove in the usual way, while the construction illustrated in Figs. 10 and 11 is provided with a casing *i*, partly surrounding the chamber *a* into which casing the products of combustion pass and from which they are discharged into the chimney flue by means of a short pipe *j*. In this last named construction, the gas passage *e* is formed outside the chamber *a* instead of on the inside.

Further, in the modification illustrated in Figs. 10 and 11, the hinged lid *c* is provided with a flap *k* which, when said lid is opened, uncovers an aperture *l* in the chamber and allows any smoke resulting from such opening, to pass upwardly into the chimney flue.

The same result is obtained by the construction shown in Figs. 12 to 14, wherein, instead of a hinged or removable closure *c* for the chamber *a*, a sliding disc *c'* is employed. When said disc is drawn forward into the position indicated in dotted lines in Fig. 14, to allow chamber *a'* to be charged with fuel, it will be seen, that any smoke from said chamber can pass directly to the chimney flue A. In this construction the fuel chamber *a'* is inclined forwardly from the lower end to facilitate charging it with fuel.

In Figs. 7 and 11, I have shown a swinging damper or valve *n* which may be provided if required, to control the admission of air to the stove below the chamber *a*, said valve being operated by any suitable means, not shown.

Instead of the ribs *d* for assisting the gravitation of the fuel, the chamber *a* may be tapered or have its cross area increased downward, as shown in Figs. 11 to 14.

In Figs. 8 and 9 I show a pair of gas burners *r* arranged to discharge gas beneath the front of the grate and serving, when lighted, to start the combustion of the fuel therein or to assist it, if required.

It is of economic importance that only the smallest quantity of town gas should be used to obtain complete combustion, and for this purpose an automatic control or check for the same is desirable. Such a control may consist of a tap or valve actuated by sand on the principle of the hour glass, and which would be reversed automatically at, say, each re-charging of the stove with fuel when mechanically effected.

To prevent the solid fuel reaching the front of the grate until it has lost its smoke forming properties, that is when it has become incandescent, a barrier may be provided which can be lowered or removed. Or, the whole grate can be made to balance or swing, or be moved forwards or backwards for this purpose.

The receptacle or chamber may be provided with a passage or passages to conduct away the generated gases or volatile matter for the purpose of extracting by-products and to return the said gases to the grate to be consumed.

From the foregoing, it is believed that my invention may be clearly understood without further description, it being borne in mind that numerous changes may be made in the details of construction without departing from the spirit of the invention as disclosed in the following claims.

What I claim and desire to secure by Letters Patent is:—

1. An open stove comprising a fuel supply chamber, a grate situated at the lower extremity of said chamber, means in one of the walls of said chamber for conveying gas from a suitable source of supply and for sucking smoke and other distillation products from the fuel in the said chamber, down and discharging the mixed constituents on to the fuel on the said grate.

2. An open stove comprising a fuel supply chamber, closed at its upper extremity and opening at its lower end onto a grate, whereby fuel is fed to said grate by gravity, a gas suction passage in one of the walls of said chamber adapted to convey gas fed from a suitable source and such smoke and other distillation products from the fuel in the said chamber, down and discharge the mixed constituents onto the fuel on said grate.

3. An open stove comprising a chimney, a fuel supply chamber closed at its upper extremity and opening at its lower end onto a grate, whereby fuel is fed to said grate by gravity, said chamber being adapted to act as a retort for effecting the distillation of said fuel and being provided with vertically extending ribs, a gas suction passage in the front wall of said chamber adapted to convey gas fed from a suitable source and suck smoke and other distillation products from the fuel in said chamber down and discharge the mixed constituents onto the fuel on said grate, said ribs being adapted to facilitate the passage of said distillation products to the point where they mix with the combustible gas.

4. An open stove as claimed in claim 3, wherein the chamber is closed at its upper extremity by a movable top whereby said chamber may be charged with fuel.

5. An open stove as claimed in claim 3 wherein the chamber is closed at its upper extremity by a movable closure which is so arranged that when opened it also uncovers an opening for the passage of smoke and other products to the chimney.

6. An open stove as claimed in claim 3, wherein means are provided for breaking up the fuel supported on said grate and driving it forward to the burning position.

7. An open stove comprising a casing, a chimney, a fuel supply chamber provided with vertically extending ribs, closed at its upper extremity and opening at its lower end onto a grate, a gas suction passage in the front wall of said chamber adapted to convey gas fed from a suitable source and suck smoke and other distillation products from the fuel in said chamber, down and discharge the mixed constituents onto the fuel on said grate, reciprocating rods arranged horizontally between the bars of said grate adapted to poke the fuel on the grate so as to break it up and drive it forward to the burning position, and gas burners arranged beneath said grate.

JULES HIPPOLYTE CORTHESY.